United States Patent
Liu et al.

(10) Patent No.: US 9,924,555 B2
(45) Date of Patent: Mar. 20, 2018

(54) METHOD AND APPARATUS FOR CONTROLLING D2D DISCOVERY PROCESS

(71) Applicant: Nokia Technologies Oy, Espoo (FI)

(72) Inventors: Yang Liu, Beijing (CN); Vinh Van Phan, Oulu (FI); Ling Yu, Espoo (FI)

(73) Assignee: Nokia Technologies OY, Espoo (FI)

( * ) Notice: Subject to any disclaimer, the term of this patent is extended or adjusted under 35 U.S.C. 154(b) by 36 days.

(21) Appl. No.: 15/032,585

(22) PCT Filed: Nov. 6, 2013

(86) PCT No.: PCT/CN2013/086632
§ 371 (c)(1),
(2) Date: Apr. 27, 2016

(87) PCT Pub. No.: WO2015/066864
PCT Pub. Date: May 14, 2015

(65) Prior Publication Data
US 2016/0270136 A1    Sep. 15, 2016

(51) Int. Cl.
*H04W 76/02* (2009.01)
*H04W 48/16* (2009.01)
*H04W 8/00* (2009.01)

(52) U.S. Cl.
CPC ......... *H04W 76/023* (2013.01); *H04W 8/005* (2013.01); *H04W 48/16* (2013.01); *H04W 76/027* (2013.01)

(58) Field of Classification Search
CPC ............... H04B 7/2121; H04B 7/2123; H04J 2203/0069; H04Q 2213/394; H04W 72/04; H04W 72/12; H04W 76/00
(Continued)

(56) References Cited

U.S. PATENT DOCUMENTS

| | | | |
|---|---|---|---|
| 2006/0279774 A1* | 12/2006 | Matsuoka | H04L 12/2803 358/1.15 |
| 2009/0323647 A1 | 12/2009 | Park et al. | |

(Continued)

FOREIGN PATENT DOCUMENTS

| | | |
|---|---|---|
| CN | 103338497 | 10/2013 |
| CN | 103347246 | 10/2013 |

(Continued)

OTHER PUBLICATIONS

"Aspects of D2D Discovery", 3GPP TSG-RAN WG2 #83, R2-132446, Qualcomm Incorporated, Agenda item: 7.5.1, Aug. 19-23, 2013, pp. 1-4.
(Continued)

*Primary Examiner* — Robert Lopata
(74) *Attorney, Agent, or Firm* — Nokia Technologies OY

(57) ABSTRACT

One of the embodiments of the present invention relates to a method for controlling a D2D discovery process at a discovering user equipment. The method comprises determining by the discovering user equipment whether discovery information in a discovering message received from a discovered user equipment is sufficient for performing the D2D discovery process or not. In response to a positive result of the determination, the user equipment continues the discovery procedure without involvement of network node, at least by using the discovery information in the discovering message; in response to a negative result of the determination, the user equipment sends a request to a network node for assistance on further discovery information for performing the D2D discovery process, and then receives the further discovery information from the network node. Embodiments of the present invention also provide methods, apparatuses and computer program products.

18 Claims, 7 Drawing Sheets

(58) Field of Classification Search
USPC .......................................................... 370/329
See application file for complete search history.

(56) References Cited

U.S. PATENT DOCUMENTS

| | | |
|---|---|---|
| 2011/0258313 A1 | 10/2011 | Mallik et al. |
| 2012/0011247 A1 | 1/2012 | Mallik et al. |
| 2013/0016629 A1 | 1/2013 | Mallik et al. |
| 2013/0114526 A1 | 5/2013 | Ahn et al. |
| 2013/0157656 A1 | 6/2013 | Gao et al. |
| 2013/0157670 A1 | 6/2013 | Koskela et al. |
| 2013/0159522 A1 | 6/2013 | Hakola et al. |
| 2013/0288668 A1 | 10/2013 | Pragada et al. |
| 2014/0274066 A1* | 9/2014 | Fodor ............... H04W 36/08 455/437 |
| 2014/0301289 A1* | 10/2014 | Johnsson ........... H04W 76/021 370/329 |
| 2014/0341132 A1* | 11/2014 | Kim ................ H04W 48/16 370/329 |
| 2015/0208440 A1* | 7/2015 | Agiwal ............. H04W 74/085 370/329 |
| 2015/0237663 A1* | 8/2015 | Wilhelmsson ...... H04W 76/023 455/450 |
| 2015/0245301 A1* | 8/2015 | Dahlman ............. H04W 8/005 455/426.1 |
| 2016/0014712 A1* | 1/2016 | Belleschi ............. H04W 8/005 455/434 |
| 2016/0021625 A1* | 1/2016 | Li ...................... H04W 72/1289 370/336 |
| 2016/0037322 A1* | 2/2016 | Nguyen ............... H04W 8/005 370/329 |
| 2016/0150390 A1* | 5/2016 | Chen ..................... H04W 68/00 370/311 |
| 2016/0255615 A1* | 9/2016 | Chatterjee ......... H04W 36/0055 370/330 |
| 2016/0278152 A1* | 9/2016 | Lei .................... H04W 4/005 |
| 2016/0345374 A1* | 11/2016 | Zhang ................. H04L 43/16 |

FOREIGN PATENT DOCUMENTS

| | | |
|---|---|---|
| GB | 2499411 A | 8/2013 |
| WO | 2013/081433 A1 | 6/2013 |
| WO | 2013163634 | 10/2013 |

OTHER PUBLICATIONS

"3rd Generation Partnership Project; Technical Specification Group Services and System Aspects; Study on architecture enhancements to support Proximity Services (ProSe) (Release 12)", 3GPP TR 23.703, V0.5.0, Jul. 2013, pp. 1-176.

"3rd Generation Partnership Project; Technical Specification Group Services and System Aspects; Service requirements for the Evolved Packet System (EPS) (Release 12)", 3GPP TS 22.278, V12.4.0, Sep. 2013, pp. 1-45.

"3rd Generation Partnership Project; Technical Specification Group Services and System Aspects; Proximity-based services (ProSe); Stage 2 (Release 12)", 3GPP TS 23.303, V12.2.0, Sep. 2014, pp. 1-61.

Partial Supplementary European Search Report received for corresponding European Patent Application No. 13897039.7, dated May 30, 2017, 14 pages.

International Search Report and Written Opinion received for corresponding Patent Cooperation Treaty Application No. PCT/CN2013/086632, dated Jul. 25, 2014, 5 pages.

Extended European Search Report received for corresponding European Patent Application No. 13897039.7, dated Sep. 4, 2017, 12 pages.

* cited by examiner

METHOD AND APPARATUS FOR CONTROLLING D2D DISCOVERY PROCESS

RELATED APPLICATION

This application was originally filed as PCT Application No. PCT/CN2013/086632 filed Nov. 6, 2013.

TECHNICAL FIELD

The embodiments of the present invention generally relate to wireless communication, particularly to methods and apparatuses for controlling a device-to-device, D2D, discovery process.

DESCRIPTION OF THE RELATED ART

In radio communication networks, such as the Long Term Evolution (LTE) or the LTE-Advanced (LTE-A) of the 3$^{rd}$ Generation Partnership Project (3GPP), it has been proposed to support for the use of network-controlled D2D communications, where user equipments (UEs) may communicate directly with each other. Examples of D2D communications include direct communications in a cluster of proximity devices; autonomous D2D communications in cellular network. D2D direct communications could offer many advantages, which may comprise longer battery life, more efficient resource usage, coverage extension, lower interference level and so on.

In D2D communications, the D2D capable UEs may trigger a so-called D2D discovery process in which the UE may advertise its capabilities and/or search for other UEs capable of D2D communications. However, how to control the D2D discovery process among communication parties is not specified in the current art.

SUMMARY OF THE INVENTION

Various aspects of examples of the invention are set out in the claims.

According to an aspect of the present invention, an embodiment of the present invention provides a method for controlling a device-to-device, D2D, discovery process at a user equipment. The method comprises determining by the user equipment whether discovery information in a discovering message received from a discovered user equipment is sufficient for performing the D2D discovery process or not. According to the method of the embodiment, in response to a positive result of the determination, the user equipment continues the discovery procedure without involvement of network node, at least by using the discovery information in the discovering message. According to the method of the embodiment, in response to a negative result of the determination, the user equipment sends a request to a network node for assistance on further discovery information for performing the D2D discovery process, and then receives the further discovery information from the network node.

In one or more embodiments of the present invention, the method further comprises receiving from the network node guiding information on D2D services; discovering a D2D service according to the guiding information, if the received guiding information is relevant to any D2D service that the user equipment desires to discover; and sending a request to the network node for further guiding information on further D2D services or performing a blind discovery process, if the received guiding information is not relevant to any D2D service that the user equipment desires to discover.

In one or more embodiments of the present invention, performing the D2D discovery process comprises performing discovery type verification, and the discovery information comprises a discovery type.

In one or more embodiments of the present invention, the user equipment may determine whether information in a discovering message received from a discovered user equipment is sufficient for judging the discovery type or not. In response to a positive result of the determination, the user equipment may sends a reply to the discovered user equipment based on the judged discovery type via a direct D2D channel between the user equipment and the discovered user equipment. In response to a negative result of the determination, the user equipment may send a request to a network node for assistance on the information discover type, and then receive the further discovery information from the network node.

According to another aspect of the present invention, an embodiment of the present invention provides a method for controlling a D2D at a network node. The method comprises receiving a request from a discovering user equipment for assistance on discovery information for performing the D2D discovery process and determining whether any discovery information pre-stored in the network node is sufficient for assisting the discovering user equipment to perform the D2D discovery process. According to the method of the embodiment, in response to a positive result of the determination, the network node sends to the discovering user equipment the discovery information based on its pre-stored discover information. According to the method of the embodiment, in response to a negative result of the determination, the network node forwards the request from the discovering user equipment to a discovered user equipment, receives discovery information from the discovered user equipment, and then sending to the discovering user equipment the discovery information.

In one or more embodiments of the present invention, the method further comprises sending to the discovering user equipment guiding information on D2D services.

In one or more embodiments of the present invention, performing the D2D discovery process comprises performing discovery type verification, and the discovery information comprises a discovery type.

According to another aspect of the present invention, an embodiment of the present invention provides a method for controlling a D2D discovery process at a user equipment. The method comprises receiving a request forwarded by a network node from a discovering user equipment to the user equipment for assistance on discovery information for performing the D2D discovery process; and sending to the network node the discovery information.

In one or more embodiments of the present invention, performing the D2D discovery process comprises performing discovery type verification, and the discovery information comprises discovery type.

According to another aspect of the present invention, an embodiment of the present invention provides a user equipment. The user equipment comprises one or more processors; and one or more memories including computer program code. When the user equipment acts as a discovering user equipment, the one or more memories and the computer program code are configured to, with the one or more processors, cause the user equipment to perform at least the following: determining whether discovery information in a discovering message received from a discovered user equipment is sufficient for performing the D2D discovery process or not; in response to a positive result of the determination, continuing the discovery procedure without involvement of network node, at least by using the discovery information in the discovering message; in response to a negative result of the determination, sending a request to a network node for assistance on further discovery information for performing the D2D discovery process, and receiving the further discovery information from the network node.

According to another aspect of the present invention, an embodiment of the present invention provides a network node. The network node comprises one or more processors; and one or more memories including computer program code. The one or more memories and the computer program code are configured to, with the one or more processors, cause the user equipment to perform at least the following: receiving a request from a discovering user equipment for assistance on discovery information for performing the D2D discovery process; determining whether any discovery information pre-stored in the network node is sufficient for assisting the discovering user equipment to perform the D2D discovery process; in response to a positive result of the determination, sending to the discovering user equipment the discovery information; in response to a negative result of the determination, forwarding the request from the discovering user equipment to a discovered user equipment, receiving discovery information feedback from the discovered user equipment, and sending to the discovering user equipment the discovery information. The network node may be an enhanced Node B or a Mobility Management Entity.

According to another aspect of the present invention, an embodiment of the present invention provides a user equipment. The user equipment comprises one or more processors; and one or more memories including computer program code. When the user equipment acts as a discovered user equipment in a D2D communication, the one or more memories and the computer program code are configured to, with the one or more processors, cause the user equipment to perform at least the following: receiving a request forwarded by a network node from a discovering user equipment to the user equipment for assistance on discovery information for performing the D2D discovery process; and sending to the network node the discovery information.

According to another aspect of the present invention, an embodiment of the present invention provides an apparatus for controlling a D2D discovery process at a user equipment. The apparatus comprises means for determining whether discovery information in a discovering message received from a discovered user equipment is sufficient for performing the D2D discovery process or not; means for continuing, for in response to a positive result of the determination, the discovery procedure without involvement of network node, at least by using the discovery information in the discovering message; and means for sending, in response to a negative result of the determination, a request to a network node for assistance on further discovery information for performing the D2D discovery process, and means for receiving the further discovery information from the network node.

According to another aspect of the present invention, an embodiment of the present invention provides an apparatus for controlling a D2D discovery process at a network node. The apparatus comprises means for receiving a request from a discovering user equipment for assistance on discovery information for performing the D2D discovery process; means for determining whether any discovery information pre-stored in the network node is sufficient for assisting the discovering user equipment to perform the D2D discovery process; means for sending, in response to a positive result of the determination, to the discovering user equipment the discovery information; and means for forwarding, in response to a negative result of the determination, the request from the discovering user equipment to a discovered user equipment, means for receiving discovery information from the discovered user equipment, and means for sending to the discovering user equipment the discovery information.

According to another aspect of the present invention, an embodiment of the present invention provides an apparatus for controlling a D2D discovery process at a user equipment. The apparatus comprises means for receiving a request forwarded by a network node from a discovering user equipment to the user equipment for assistance on discovery information for performing the D2D discovery process; means for sending to the network node the discovery information.

According to other aspects of the present invention, embodiments of the present invention also provide corresponding chipsets, computer program products that can be used to cause a corresponding device to perform a process according to any of the method embodiments of the present inventions.

BRIEF DESCRIPTION OF THE DRAWINGS

Inventive features regarded as the characteristics of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION OF THE PREFERRED EMBODIMENT

Hereinafter, embodiments of the present invention will be described with reference to the accompanying drawings. In the following description, many specific details are illustrated so as to understand the present invention more comprehensively. However, it is apparent to the skilled in the art that implementation of the present invention may not have these details. Additionally, it should be understood that the present invention is not limited to the particular embodiments as introduced here. For example, some embodiments of the present invention are not limited to be implemented in BLE system. On the contrary, any arbitrary combination of the following features and elements may be considered to implement and practice the present invention, regardless of whether they involve different embodiments. Thus, the following aspects, features, embodiments and advantages are only for illustrative purposes, and should not be understood as elements or limitations of the appended claims, unless otherwise explicitly specified in the claims.

Figure 1:
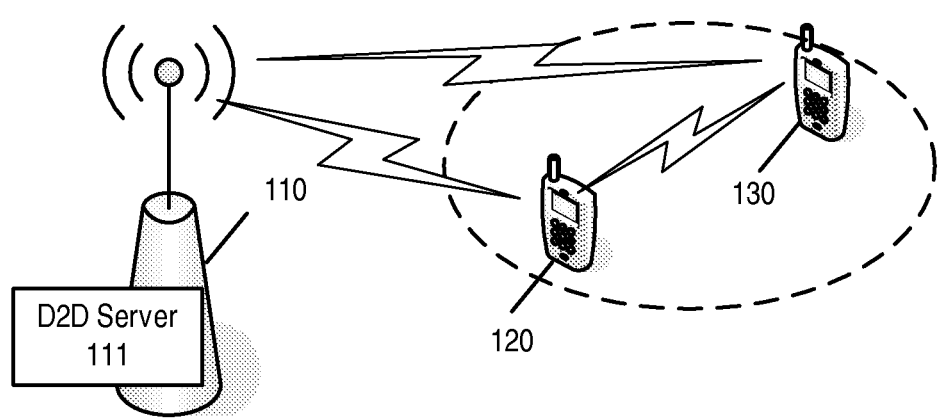
FIG. 1 schematically illustrates system 100 in which one or more embodiments of the present invention may be implemented.

FIG. 1 schematically illustrates system 100 in which one or more embodiments of the present invention may be implemented.

The system 100 combines a D2D communication services with a wireless access network such a LTE network. UEs 120, 130 communicate with a central network node illustrated as an eNodeB 110. Both UE 120 and UE 130 are capable of D2D communications. When UE 120 and UE 130 are close enough, they can directly communicate with each other without the need to communicate through eNodeB 110.

It is desirable for a UE to become aware of other D2D-capable UE and the D2D services provided there from. In an exemplary discovery process, UE 120, which acts as a discovering UE, may search other D2D-capable UEs in close proximity and figure out if they provide any D2D services it may be interested in. UE 130, which may act as a discovered UE, may broadcast a discovery message to advertise its discovery information such as D2D capability information, UE-related information, application or service related information, and so on.

As shown in FIG. 1, block 111 denotes a functionality element embedded or included in eNodeB 110, for serving D2D communication applications, which is so called "D2D server" or "ProSe server" (hereafter, simply referred as to "D2D server"). D2D server 111 usually pre-stores registration information of D2D capable UEs in the cell. It would make sense for D2D server 111 to assist the control of a discovery process between UE 120 and UE 130 (for example, making decisions or verifying discovery information, etc.), if such pre-stored registration information can constitute "discovery context" of the discovery process. However, in such discovery solutions, D2D server 111 at network side will be involved too frequently, which inevitably introduces too much signaling burden for D2D discovery. Various embodiments of the present disclosure provide adaptive control on hybrid discovery process, e.g. on how to verify the discovery type.

It should be appreciated that D2D server 111 may be embedded or not be embedded in any network node at network side, although in the example of FIG. 1 it is included in eNodeB 110. As another example without any limitation, D2D server 111 may be incorporated in Mobility Management Entity (MME) as one of logical functionality entities thereof. In another example, D2D server 111 may be a stand-alone functionality entity in the system. Therefore, those skilled in the art can understand that how to implement D2D server per se cannot constitute any limitation on various embodiments of the present invention.

With references to FIGS. 2 to 6, various embodiments of the present invention will be set forth in detail.

Figure 2:
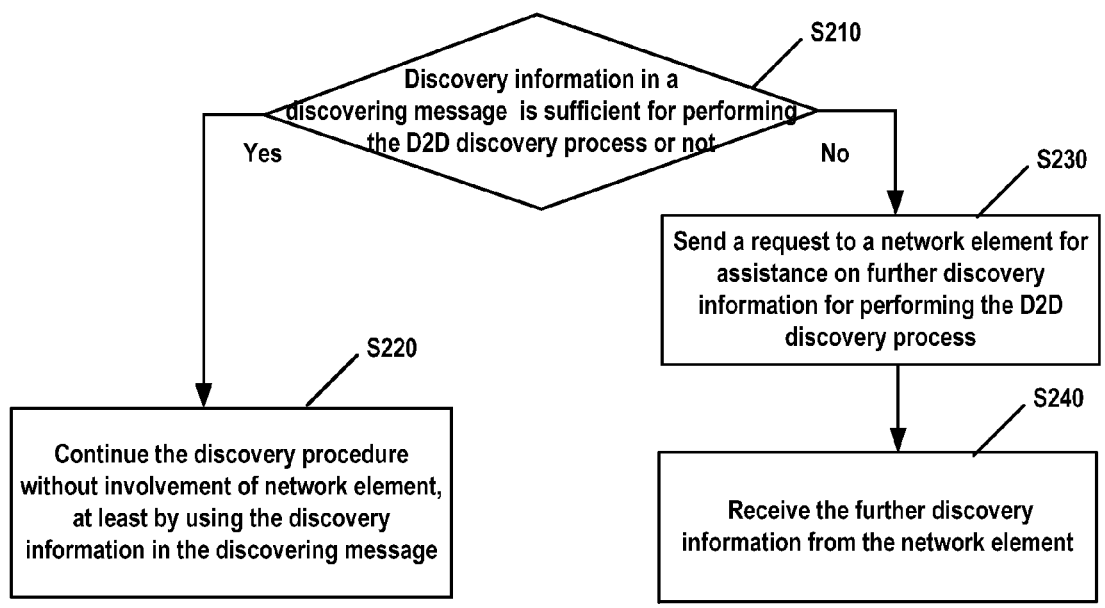
FIG. 2 schematically illustrates an exemplary flow chart of a method for controlling a D2D discovery process at a discovering user equipment according to one or more embodiments of the present invention.

FIG. 2 schematically illustrates an exemplary flow chart of a method 200 for controlling a D2D communication discovery process at a discovering UE according to one or more embodiments of the present invention.

As shown in FIG. 2, in step S210, a discovering UE, such as UE 120 as illustrated in FIG. 1, determines whether discovery information in a discovering message received from a discovered UE, such as UE 130 as illustrated in FIG. 1, is sufficient for performing the D2D discovery process or not.

In an embodiment of the present disclosure, the discovering UE may conduct a blind discovery to identify the discovered UE that provides desirable D2D services.

However, in an advantageous alternative embodiment, the discovering UE may receive guiding information on D2D services from a network element, such as D2D server 111 as illustrated in FIG. 1, for guiding the discovering UE to identify its desired services. The guiding information may include information relating to applications, services available in the cell (such as application ID, type, location, and so on), the limitation on the number of discoverable UEs requested/reported by the discovering UE, and any suitable information that can be used to guide the discovering UE to determine D2D discovering behavior.

In one implementation, the guiding information may be provided as common control signaling (e.g. in broadcasted system information) from eNodeB 110 to all D2D-capable UEs in the cell. It should be appreciated that this may be applicable to the embodiments where D2D server 111 is not embedded in eNodeB 110. In such embodiments, D2D server 111 in any other suitable network node may provide corresponding information to eNodeB 110 and then eNodeB 110 uses the common control signaling to broadcast the information to UEs.

Additionally or alternatively, for the connected mode UEs, the network node could provide the guiding information via dedicated Radio Resource Connection (RRC) signaling, e.g. based on registered D2D discovery context information or upon the request from discovering UEs.

If the received guiding information is relevant to any D2D service that the discovering UE desires to discover, it then can identify a discovered UE and discover a D2D service according to the guiding information. Otherwise, the discovering UE may have two options to proceed with the discovery process. One is to send a request to the network element for further guiding information on further D2D services; the other is to choose to perform a blind discovery process.

The discovery message broadcast by the discovered UE may comprise some discovery information, for example, D2D capability information, UE-related information, application or service related information, and so on.

If the determination in step S210 is positive, i.e., discovery information in the discovering message received from the discovered UE, such as UE 130, is sufficient for performing the D2D discovery process, then in step 220, the discovering UE such as UE 120 continues the discovery procedure without involvement of network element such as D2D server 111 embedded in eNodeB 110, at least by using the discovery information in the discovering message.

If the determination in step 210 is negative, i.e., discovery information in the discovering message received from the discovered UE, such as UE 130, is insufficient for performing the D2D discovery process in response to a negative result of the determination, then in step S230, the discovering UE such as UE 120 sends a request to a network element such as D2D server 111 for assistance on further discovery information for performing the D2D discovery process. In one advantageous implementation, the request message may contain, for example, multiple requests/reports for different discoverable UEs; on the other hand, the limitation on the number of the requested/reported UEs may be set in the network element and provided to the corresponding UE in the common or dedicated signaling procedure of providing discovery guiding information on D2D services.

Once the limitation is met for the discovering UE, it will not include new request for new UEs for the time being. Once the network element receives the request from the discovering UE, it will assistant the discovering UE to accomplish the discovery process for example by identifying and providing further discovery information. The processing performed at the network element will be described below with respect to FIG. 3. As such, the discovering UE can receive in step S240 the further discovery information as required from the network element.

Figure 3:
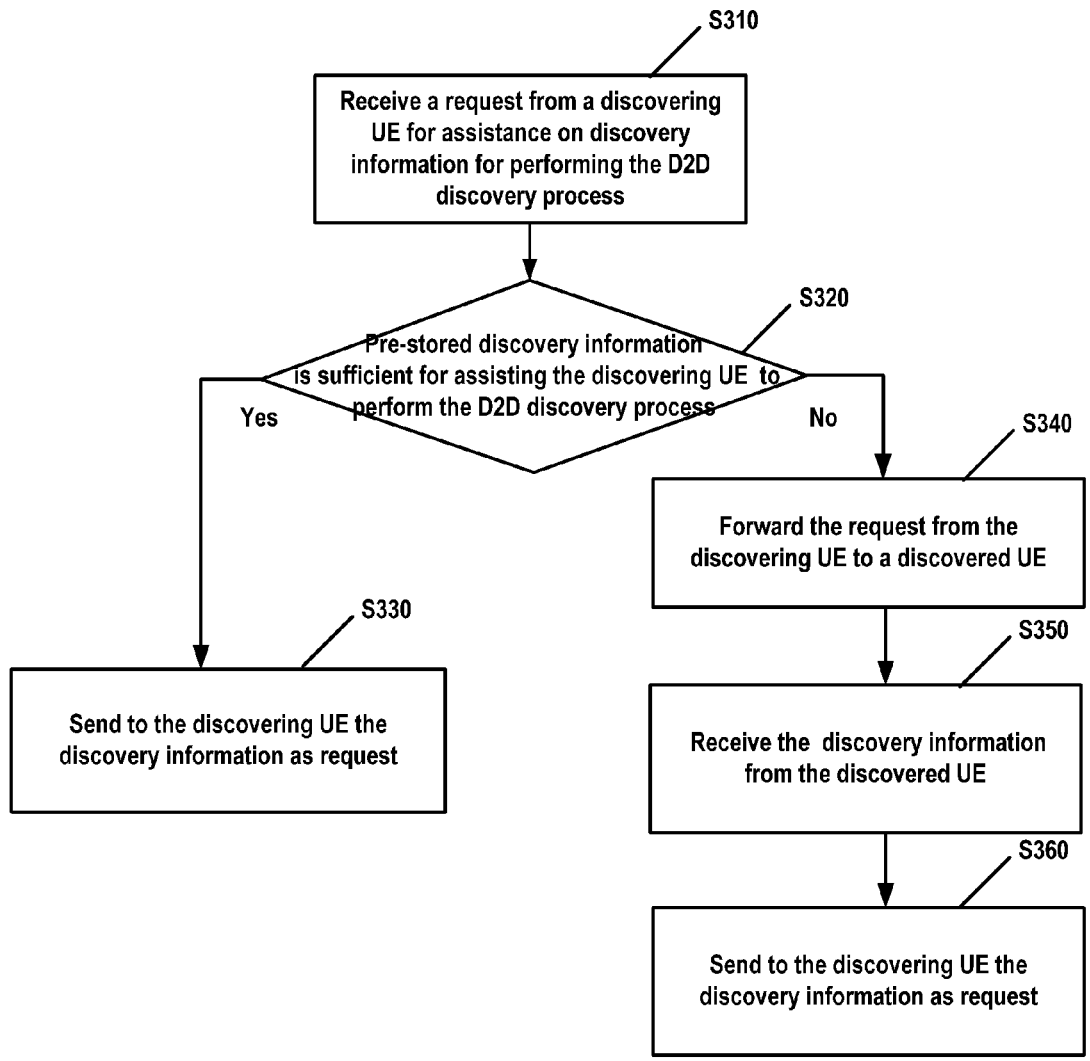
FIG. 3 schematically illustrates an exemplary flow chart of a method for controlling a D2D discovery process at a network element according to one or more embodiments of the present invention.

FIG. 3 schematically illustrates an exemplary flow chart of a method 300 for controlling a D2D communication discovery process at a network element according to one or more embodiments of the present invention.

As shown in FIG. 3, in step S310, the network element, such as D2D server 111 as illustrated in FIG. 1, receives a request from a discovering UE, such as UE 120 as illustrated in FIG. 1, for assistance on discovery information for performing the D2D discovery process.

In step S320, the network element determines whether any discovery information pre-stored therein is sufficient for assisting the discovering UE to perform the D2D discovery process. Upon receiving discovery assistance request from the discovering UE, the network element could check the discovery information based on pre-stored discovery context of the discovering UE and targeted discovered UE(s) and/or application(s)/service(s), as requested. As a consequence, the determination can be made by the network element if the requested discovery information is available.

If the determination in step S320 is positive, in step S330, the network element then sends to the discovering UE the discovery information as request.

If the determination in step S320 is negative, in step S340, the network element forwards the request from the discovering UE to the target discovered UE(s), such as UE 130 as illustrated in FIG. 1. In an implementation of the embodiment, in case that the target discovered UE is in a RRC_Connected state, the network element will forward the request via dedicated RRC messages; in case that the target discovered UE is in a RRC_Idle state, the network element may initiate a paging process directed to the target discovered UE to get it connected to network side for further communication. Finally the network element will send, in step S360, the discovery information to the discovering UE after receiving in step S350 the feedback from the target discovered UE.

In an advantageous alternative embodiment, in order to guide the discovery behavior of the discovering UE, the network element, such as D2D server 111 as illustrated in FIG. 1, sends to the discovering UE guiding information on D2D services. The guiding information may include information relating to applications, services available in the cell (such as application ID, type, location, and so on), the limitation on the number of discoverable UEs requested/reported by the discovering UE, and any suitable information that can be used to guide the discovering UE to determine D2D discovering behavior. In one implementation, the guiding information may be provided as common control signaling (e.g. in broadcasted System Information) from the network element, such as D2D server 111 embedded in eNodeB 110 as illustrated in FIG. 1, to all D2D-capable UEs in the cell. Additionally or alternatively, for the connected mode UEs, the network element could provide the guiding information via dedicated Radio Resource Connection (RRC) signaling, e.g. based on registered D2D discovery context information or upon the request from discovering UEs.

Figure 4:
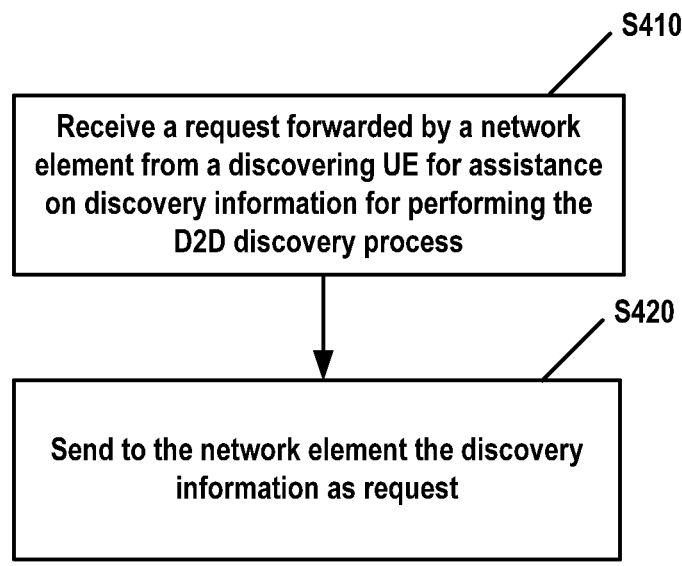
FIG. 4 schematically illustrates an exemplary flow chart of a method for controlling a D2D discovery process at a discovered user equipment according to one or more embodiments of the present invention.

FIG. 4 schematically illustrates an exemplary flow chart of a method 400 for controlling a D2D communication discovery process at a discovered UE according to one or more embodiments of the present invention.

As shown in FIG. 4, in step S410, a discovered UE, such as UE 130 as illustrated in FIG. 1, can receive a request forwarded by the network element, such as D2D server 111 as illustrated in FIG. 1, from the discovering UE, such as UE 120 as illustrated in FIG. 1, for assistance on discovery information for performing the D2D discovery process.

In an implementation of the embodiment, in case that the discovered UE is in a RRC_Connected state, it may receive the request via dedicated RRC messages; in case that the discovered UE is in a RRC_Idle state, it may respond to a paging process initiated by the network element and then set up a connection with the network side for further communication.

The discovered UE may check its own discovery information and in step S420, send to the network element the discovery information as requested.

Some of the embodiments according to the present invention have been described from the perspective of each of the different communication parties, i.e., the discovering UE, network element in a network node such as D2D server embedded in eNodeB or MME, and discovered UE. It should be noted that adaptive control on hybrid discovery process according to various embodiments of the present invention can be employed to verify any kinds of discovery information, for example, verifying discovery type, identifying UE and/or even the user of the UE, verifying application/service related information, etc. For the purpose of illustration without any limitation, the signaling procedure for discovery type verification during the discovery process will be discussed below in detail to further set forth the adaptive control on hybrid discovery process according to various embodiments of the present invention.

Figure 5:
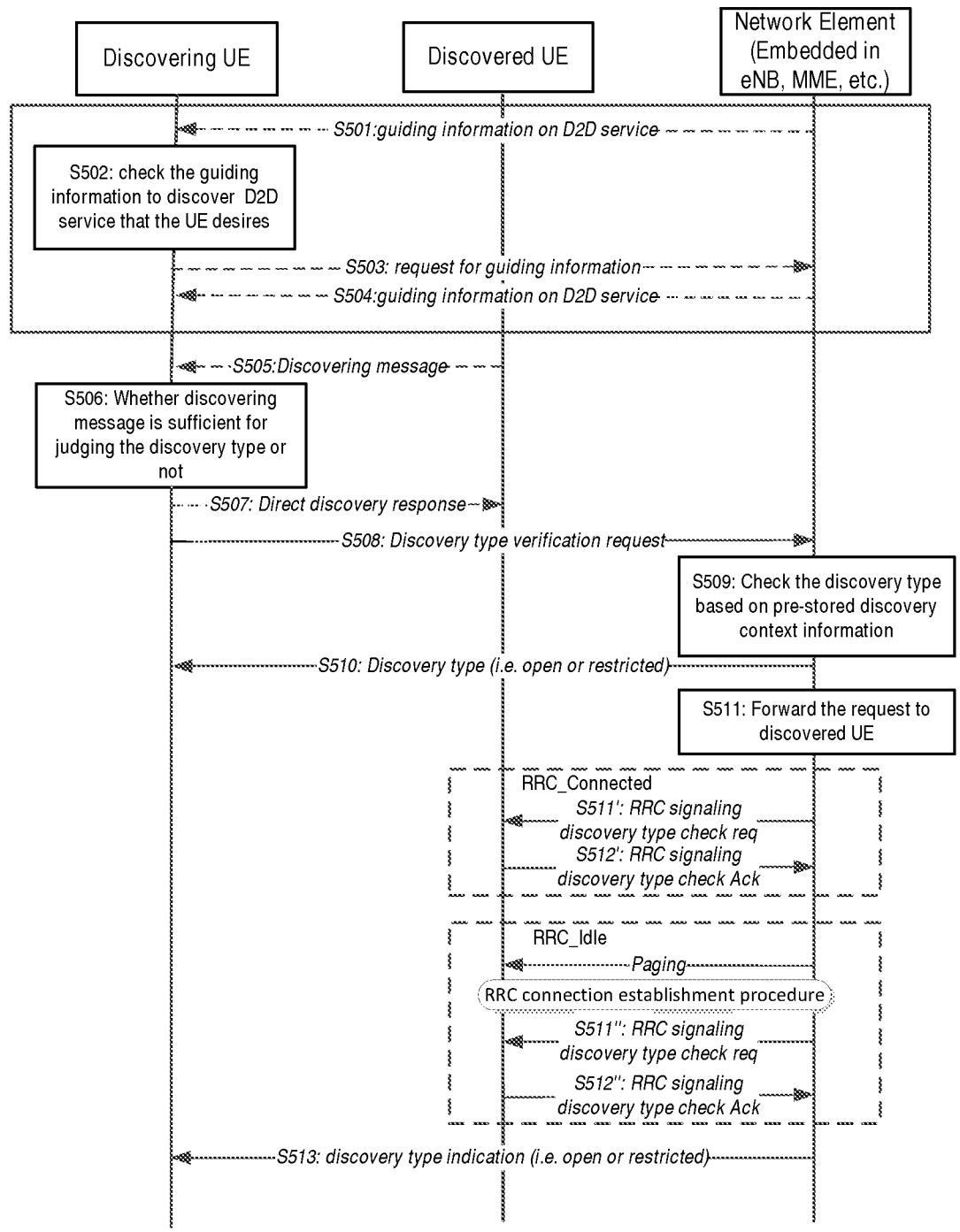
FIG. 5 schematically illustrate an exemplary signal flow diagram for discovery type verification according to one or more embodiments of the present invention.

FIG. 5 schematically illustrates an exemplary signal flow diagram for discovery type verification according to one or more embodiments of the present invention.

Optionally, in step S501, a discovering UE, such as UE 120 as illustrated in FIG. 1, may receive guiding information on D2D service from a network element, such as D2D service 111 as illustrated in FIG. 1. The guiding information may include information relating to applications, services available in the cell (such as application ID, type, location, and so on), the limitation on the number of discoverable UEs requested/reported by the discovering UE, and any suitable information that can be used to guide the discovering UE to determine D2D discovering behavior. In one implementation, the guiding information may be provided as common control signaling e.g. in system information from the network element. Additionally or alternatively, for the connected mode UEs, the network element could provide the guiding information via dedicated RRC signaling, e.g. based on registered D2D discovery context information or upon the request from discovering UEs.

In step S502, the discovering UE may check if the received guiding information is relevant to any D2D service that the UE desires to discover. If the received guiding information is relevant to any D2D service that the discovering UE desires to discover, it then can identify a discovered UE and discover a D2D service according to the guiding information. Otherwise, the discovering UE may send in step S503 a request to the network element for further guiding information on further D2D services and then receive in step S504 further guiding information from the network element. As another optional implementation, the discovering UE may choose to proceed with performing (not shown in FIG. 5) a blind discovery process to identify interested services.

In step S505, the discovering UE detects and receives a discovering message from the identified discovered UE.

In step S506, the discovering UE determines whether discovery information in the discovering message received from the discovered UE is sufficient for performing the D2D discovery process or not. Specifically, the discovering UE may try to check on the discovery type based on the information provided in the discovery message and the guiding information received in step S501 or step S504, so as to determine whether information in the discovering message is sufficient for judging the discovery type or not.

If the discovering UE can make the decision on the discovery type (i.e. either open or restricted), the discovering UE continues the discovery procedure without involvement of network element, e.g., in step 507, the discovering UE can send a reply to the discovered UE based on the judged discovery type via a direct D2D channel between the discovering UE and the discovered UE without involving network side.

However, if the information included in the discovery message is not sufficient for making such a decision on the discovery type, then, in step S508, the discovering UE can then send the request to network side for assistance on verifying the discovery type.

In step S509, the network element checks the discovery type based on the pre-stored discovery context information.

In case that the network element is able to decide the discovery type (an open discovery or restricted discovery), then, in step S510, the network element will inform the discovering UE of the determined discovery type.

In case that the network element is unable to decide the discovery type (an open discovery or restricted discovery), then, in step S511, the network element can forward the request from the discovering UE to the discovered UE to execute the discovery type verification.

According to an implementation of the present invention, if the discovered UE is in a RRC_Connected state, then the network element may just send in step S511' the request via a RRC message, for example, a discovery type check request and the discovered UE reply with a feedback via discovery type check Ack in step S512' after verification.

According to another implementation of the present invention, if the discovered UE is in a RRC_Idle state, then, the network element needs to trigger a RRC connection establishment procedure to get discovered UE connected for discovery type verification. When the discovered UE has become RRC connected, the network element send in step S511" the request via a RRC message, for example, a discovery type check request and the discovered UE reply with a feedback via discovery type check Ack in step S512" after verification.

In step S513, the network element sends to the discovering UE the discovery type feedback by the discovered UE.

It can be seen that a adaptive way of handling discovery information e.g. open/restricted discovery verification method is designed to support D2D discovery procedure in the embodiments of the present invention. The adaptive controlling of the hybrid D2D discovery process according to various embodiments of the present invention will not always involve network side leading to introducing too much signaling burden, or have to design a huge amount of discovery messages for different types of applications.

It should be noted that the above depiction is only exemplary, not intended for limiting the present invention. In other embodiments of the present invention, this method may have more, or less, or different steps, and numbering the steps is only for making the depiction more concise and much clearer, but not for stringently limiting the sequence between each steps; while the sequence of steps may be different from the depiction. For example, in some embodiments, the above one or more optional steps may be omitted. Specific embodiment of each step may be different from the depiction. All these variations fall within the spirit and scope of the present invention.

Figure 6:
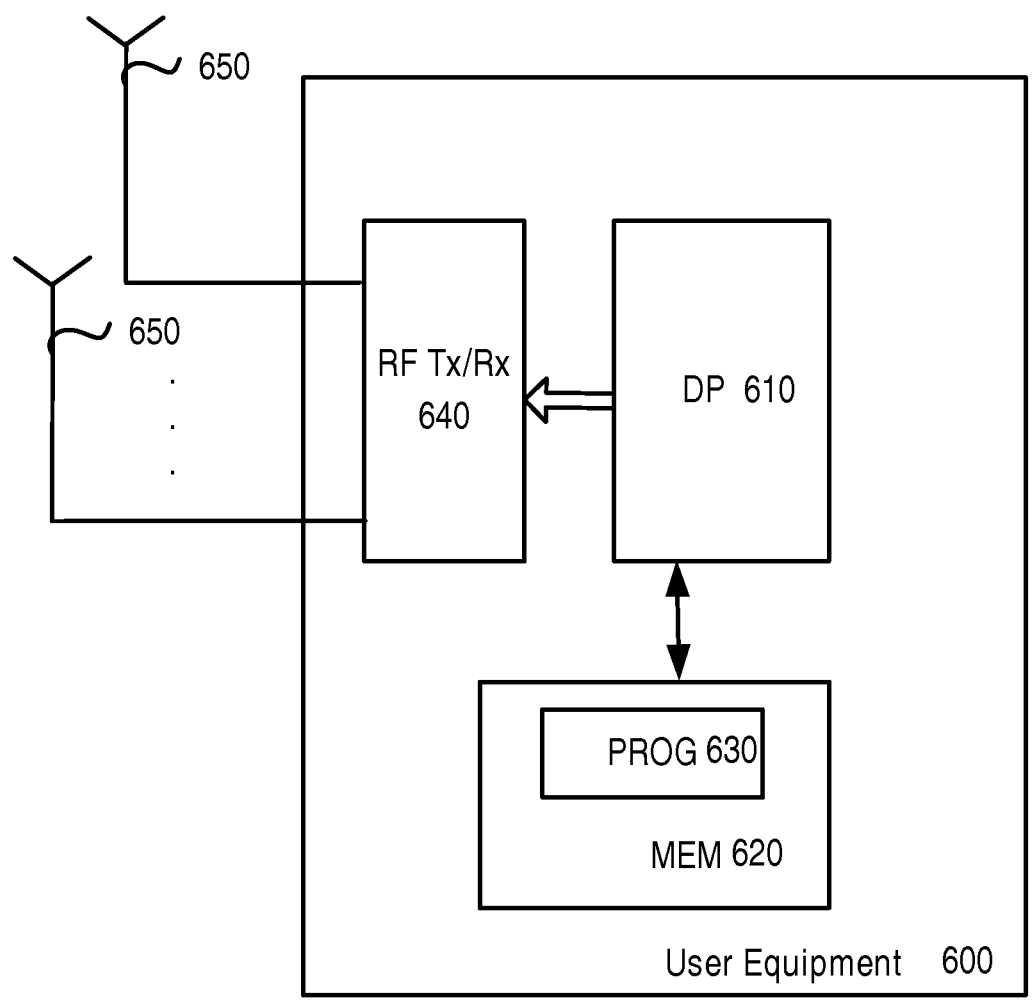
FIG. 6 a block diagram of a user equipment according to one or more embodiments of the present invention.

FIG. 6 schematically shows a simplified block diagram of a UE according to an embodiment of the present invention.

In general, the various embodiments of the UE 600 can include, but are not limited to, cellular phones, PDAs having wireless communication capabilities, portable computers having wireless communication capabilities, image capture devices such as digital cameras having wireless communication capabilities, gaming devices having wireless communication capabilities, as well as portable units or terminals that incorporate combinations of such functions.

The UE 600 is adapted for communication with one or more base stations in the wireless communication system via its antenna array 650.

The UE 600 includes a data processor (DP) 610, a memory (MEM) 620 coupled to/embedded in the DP 610, and suitable RF transmitter TX/receiver RX module 640 coupling the antenna array 550 to the DP 610. The RF TX/RX module 640 is for bidirectional wireless communications with at least one base station. The MEM 620 stores a program (PROG) 630.

The PROG 630 is assumed to include program instructions that, when executed by the DP 610, enable the UE 600 to operate in accordance with the exemplary embodiments of this invention, as discussed herein with the method 200, as shown in FIG. 2, when the UE 600 serves as a discovering UE; or as discussed herein with the method 400, as shown in FIG. 4, when the UE 600 serves as a discovered UE.

The MEM 620 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the UE 600, there may be several physically distinct memory units in the UE 600.

The DP 610 performs any required determination as described with reference to FIGS. 2 and 3. The DP 610 may be of any type suitable to the local technical environment, and may include one or more of general purpose computers, special purpose computers, microprocessors, DSPs and processors based on multi-core processor architecture, as non-limiting examples.

Figure 7:
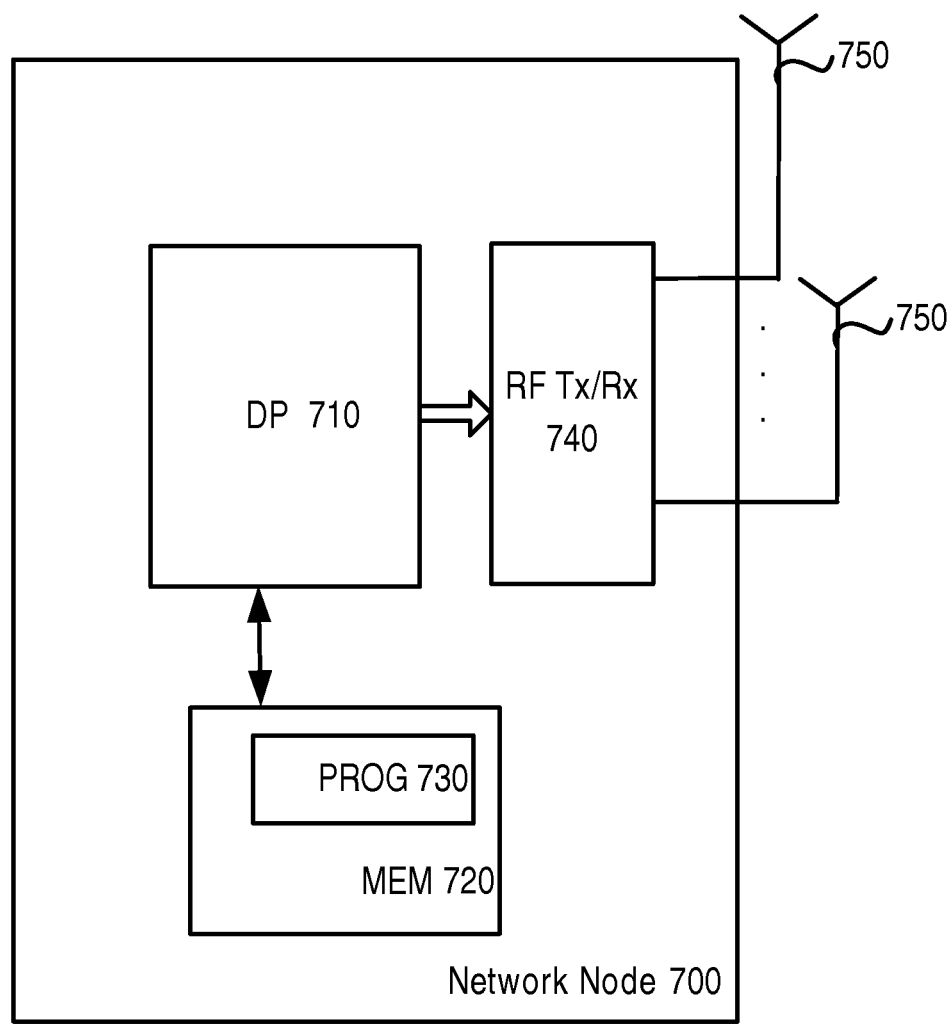
FIG. 7 schematically illustrates a block diagram of a network node which may include a D2D network element according to one or more embodiments of the present invention.

FIG. 7 schematically shows a simplified block diagram of a network node which can include a D2D server according to an embodiment of the present invention.

The network node 700 is adapted for communication with a group of UEs in the wireless communication system. As discussed previously, the network node 700 can be an eNodeB, MME, or any other suitable network node.

The network node 700 includes a data processor (DP) 710, a memory (MEM) 720 coupled to/embedded in the DP 710, and suitable RF transmitter TX/receiver RX module 740 coupling antenna array 750 to the DP 710. The RF TX/RX module 740 is for bidirectional wireless communications with at least one UE. The MEM 720 stores a program (PROG) 730.

The PROG 730 is assumed to include program instructions that, when executed by the DP 710, enable the network node 700 to operate in accordance with the exemplary embodiments of this invention, as discussed herein with the method 300, as shown in FIG. 3.

The MEM 720 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the network node 700, there may be several physically distinct memory units in the network node 700.

The DP 710 performs any required determination as described with reference to FIG. 3. The DP 710 may be of any type suitable to the local technical environment, and may include one or more of general purpose computers, special purpose computers, microprocessors, DSPs and processors based on multi-core processor architecture, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block and signaling diagrams, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. As well known in the art, the design of integrated circuits is by and large a highly automated process.

The present invention may also be embodied in the computer program product which comprises all features capable of implementing the method as depicted herein and may implement the method when loaded to the computer system.

The present invention has been specifically illustrated and explained with reference to the preferred embodiments. The skilled in the art should understand various changes thereto in form and details may be made without departing from the spirit and scope of the present invention.

What is claimed is:

1. A method for controlling a device-to-device, D2D, discovery process at a user equipment, comprising:
    receiving from a network element guiding information on D2D services;
    discovering a D2D service according to the guiding information, if the received guiding information is relevant to any D2D service that the user equipment desires to discover;
    determining whether discovery information in a discovering message received from a discovered user equipment is sufficient for performing the D2D discovery process or not;
    in response to a positive result of the determination, continuing the discovery procedure without involvement of network element, at least by using the discovery information in the discovering message;
    in response to a negative result of the determination,
        sending a request to the network element for assistance on further discovery information for performing the D2D discovery process, and
        receiving the further discovery information from the network element.

2. The method according to claim 1, further comprising:
    sending a request to the network element for further guiding information on further D2D services or performing a blind discovery process, if the received guiding information is not relevant to any D2D service that the user equipment desires to discover.

3. The method according to claim 2, wherein the guiding information includes information indicative of limitation on the number of discovered user equipments that the user equipment can request to the network element.

4. The method according to claim 1, wherein performing the D2D discovery process comprises performing discovery type verification, and wherein the discovery information comprises discovery type.

5. The method according to claim 4, wherein
    the determining comprises determining whether information in a discovering message received from a discovered user equipment is sufficient for judging the discovery type or not;
    continuing the discovery procedure without involvement of network element comprises sending a reply to the discovered user equipment based on the judged discovery type via a direct D2D channel between the user equipment and the discovered user equipment.

6. The method according to claim 5, wherein receiving the further discovery information from the network element comprises receiving a message indicative of the discovery type from the network element.

7. A user equipment, comprising:
    one or more processors; and
    one or more memories including computer program code,
    the one or more memories and the computer program code configured to, with the one or more processors, cause the user equipment to perform at least the following:
    receiving from a network element guiding information on D2D services;
    discovering a D2D service according to the guiding information, if the received guiding information is relevant to any D2D service that the user equipment desires to discover;
    determining whether discovery information in a discovering message received from a discovered user equipment is sufficient for performing the D2D discovery process or not;
    in response to a positive result of the determination, continuing the discovery procedure without involvement of network element, at least by using the discovery information in the discovering message;
    in response to a negative result of the determination,
        sending a request to the network element for assistance on further discovery information for performing the D2D discovery process, and receiving the further discovery information from the network element.

8. The user equipment according to claim 7, wherein the at least one memory and the computer program code are further configured to, with the at least one processor, cause the user equipment to perform at least the following:
sending a request to the network element for further guiding information on further D2D services or performing a blind discovery process, if the received guiding information is not relevant to any D2D service that the user equipment desires to discover.

9. The user equipment according to claim 8, wherein the guiding information includes information indicative of limitation on the number of discovered user equipments that the user equipment can request to the network element.

10. The user equipment according to claim 7, wherein performing the D2D discovery process comprises performing discovery type verification, and wherein the discovery information comprises discovery type.

11. The user equipment according to claim 10, wherein
the determining comprises determining whether information in a discovering message received from a discovered user equipment is sufficient for judging the discovery type or not;
continuing the discovery procedure without involvement of network element comprises sending a reply to the discovered user equipment based on the judged discovery type via a direct D2D channel between the user equipment and the discovered user equipment.

12. The user equipment according to claim 11, wherein receiving the further discovery information from the network element comprises receiving a message indicative of the discovery type from the network element.

13. A network element, comprising:
one or more processors; and
one or more memories including computer program code, the one or more memories and the computer program code configured to, with the one or more processors, cause the network element to perform at least the following:
receiving a request from a discovering user equipment for assistance on discovery information for performing a D2D discovery process;
determining whether any discovery information pre-stored in the network element is sufficient for assisting the discovering user equipment to perform the D2D discovery process;
in response to a positive result of the determination, sending to the discovering user equipment the discovery information;
in response to a negative result of the determination,
forwarding the request from the discovering user equipment to a discovered user equipment,
receiving discovery information feedback from the discovered user equipment, and
sending to the discovering user equipment the discovery information.

14. The network element according to claim 13, wherein the at least one memory and the computer program code are further configured to, with the at least one processor, cause the network element to perform at least the following:
sending to the discovering user equipment guiding information on D2D services.

15. The network element according to claim 14, wherein the guiding information includes information indicative of limitation on the number of discovered user equipments that the user equipment can request to the network element.

16. The network element according to claim 13, wherein performing the D2D discovery process comprises performing discovery type verification, and wherein the discovery information comprises discovery type.

17. The network element according to claim 13, wherein the network element is a D2D server or a ProSe server.

18. The network element according to claim 13, wherein the network element is included in an enhanced Element B or a Mobility Management Entity.

* * * * *